Dec. 20, 1960 P. W. MARTIN ET AL 2,965,757
SPECTRAL ANALYSIS OF MATERIALS
Filed Aug. 3, 1953 3 Sheets-Sheet 2

PHILIP W. MARTIN
ROBERT W. PRINGLE
KENNETH I. ROULSTON
INVENTORS.

Attorney

Dec. 20, 1960          P. W. MARTIN ET AL          2,965,757
SPECTRAL ANALYSIS OF MATERIALS
Filed Aug. 3, 1953                                    3 Sheets-Sheet 3

PHILIP W. MARTIN
ROBERT W. PRINGLE
KENNETH I. ROULSTON
INVENTORS.

BY
Attorney

United States Patent Office 2,965,757
Patented Dec. 20, 1960

2,965,757

SPECTRAL ANALYSIS OF MATERIALS

Philip W. Martin, 1345 West Road, Whittier, Calif.; and Robert W. Pringle, 131 Niagara St., and Kenneth I. Roulston, 292 Baltimore Road, both of Winnipeg, Manitoba, Canada Filed Aug. 3, 1953, Ser. No. 371,872

24 Claims. (Cl. 250—83.3)

The present invention relates generally to the examination and determination of the nature and characteristics of earth materials, and is more particularly concerned with an improved method and apparatus, wherein the materials are bombarded with nuclear radiations, and the induced activity analyzed by responsive sensing means.

Briefly considered in its broad concept, the invention contemplates improved apparatus and methods by which materials may be bombarded to produce unstable isotopes, and detecting means by which the energy distributions of the resulting characteristic radiations and their decay rates may be analyzed. The scintillation spectrometer is used to study the energy distribution of the decay gamma rays of the unstable isotopes as well as the decay time of the isotopes.

While the invention, for illustrative purposes, will be described herein in connection with oil wells for the logging of the various geological formations therein, the invention is susceptible of utilization in other fields, for example, it may be utilized for the study and test of geological samples which have been obtained in mining operations as the result of diamond drilling, and that it not only enables the identification of various elements characterized by their half-lives or by the half-lives of isotopes resulting from them by bombardment, but that a quantitative estimate can also be made of the percentage concentration of the element in question. Thus the exploration of old mining shafts and drives, as well as, numerous old drilling holes might turn up extremely valuable information which was passed over in earlier tests. Due to the ability of the scintillation spectrometer to average the value of material in large volumes, a quite true picture of what surrounds a test hole, may be obtained. Thus, the present invention enables the analysis of large and small amounts of material with equal ease.

By the utilization of our unique invention, it is possible to analyze the drilling mud at the surface of a well during the drilling process, and thus determine whether a fresh oil bearing formation had been reached. It is also possible to analyze the gases retrieved from the drilling mud at the surface. For example, a vacuum pump is applied to the mud arriving at the surface of the well for removing the volatiles from the mud, compressing these volatiles and irradiating them, and subsequently studying their activity. The induced activity at the surface in these gases is created by alpha or proton bombardment in addition to the use of neutrons. Also the invention is utilized for the analysis of cores at the surface, and such analysis may be carried out after grinding of the cores, although grinding is not essentially necessary.

It is therefore possible with the present invention to analyze the formation content by the above methods, and at the same time to record radiation logs of the following types:

(a) Gamma ray log
(b) Neutron log
(c) Electric log

It is one object of the present invention to provide improved apparatus and method by which elements contained in a material, such as the formation surrounding a well bore, or the like, is identified.

A further object is to provide an apparatus and method by which a continuous logging survey or discontinuous step-by-step survey is conducted.

A still further object is to provide apparatus which is utilized simultaneously with other logging equipment in making a survey, or is utilized independently.

Another object is to provide material analyzing means having wide application, which is utilized in the identification of elements in mining operations, which is utilized for the analyzing of drilling mud or gases extracted therefrom, and which is also adapted to analyze core materials before and after grinding.

Still another object is to provide an apparatus and method by which materials are selectively separated with respect to their identification.

Another object of the invention is to provide an improved method and means for continuous spectral analysis of materials and earth formations, which is particularly well suited for well logging, and which will automatically, quickly and consistently provide a quantitative indication of elements present in the material or formation.

It is also an object to provide an improved spectral analysis method and means which embodies the electrostatic storage of information and its translation into a visible record.

Further objects of the invention will be brought out in the following part of the specification, wherein detailed description is for the purpose of fully disclosing the invention without placing limitations thereon.

Referring to the accompanying drawings, which are for illustrative purposes only.

*Apparatus and method generally*

Figures 1, 9:
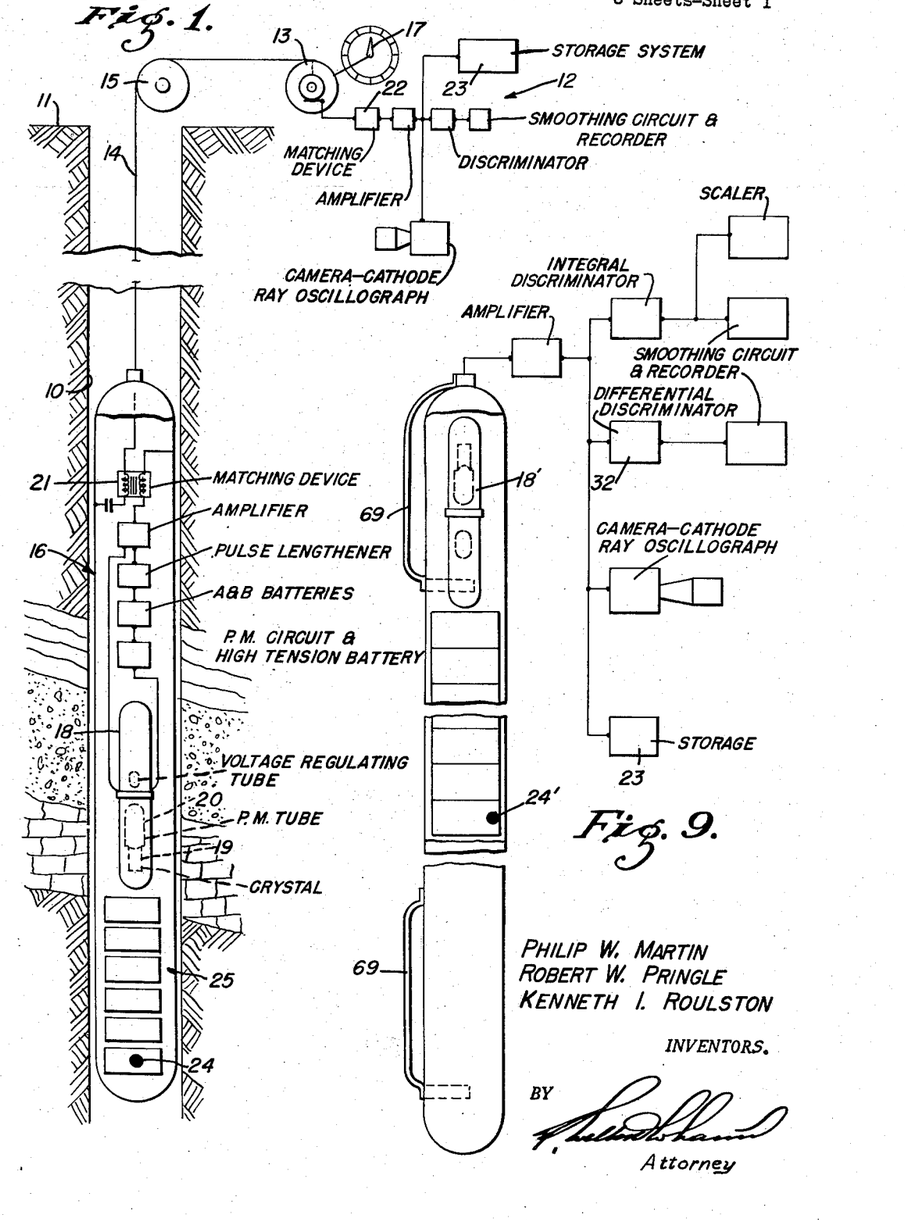
Fig. 1 is a view generally illustrating apparatus employing the herein described invention, and by means of which the novel method or methods are practiced.
Fig. 9 is a view illustrating a modified arrangement of the apparatus disclosed in Fig. 1.

Referring now to the drawings, Fig. 1 represents a typical well bore structure 10 which passes from the ground surface 11 downwardly through a plurality of different formation structures which have been distinguished in the drawing by means of various types of shading.

At the ground surface, there is illustrated a surface station, as generally indicated by numeral 12, and which includes suitable hoisting equipment which may comprise, for example, a hoisting drum 13 from which a hoisting cable conductor 14 is trained over a guide pulley 15 and connected to an exploration unit within the well bore, as generally indicated by the numeral 16.

As shown, the hoisting drum is provided with a suitable indicating mechanism, which may comprise a rotating pointer 17 associated with a graduated dial or other suitable means for indicating the amount of cable which has been wound and unwound thereon, or in other words the position of the exploration unit within the well bore. With this equipment, the exploration unit may be readily controlled and moved within the well bore in carrying out the logging operation and the method or methods of the present invention. It will, of course, be appreciated that strip recorders are utilized and that their linear travel is coordinated with cable travel.

The exploration unit, it will be appreciated, may assume various forms of construction, and in general has been disclosed herein as comprising the features of construction which have been shown and described in detail with concomitant electronic operating circuits in the copending application of Philip W. Martin and Robert William Pringle, Serial No. 241,334, covering Well Logging Device, now Patent No. 2,686,268.

Briefly, the exploration unit is shown herein as comprising a cell structure 18 within which there is mounted a scintillation crystal 19 or other suitable means having the property of reacting under the effects of gamma rays.

Such a crystal has been described in the above noted copending application as consisting of sodium iodide activated with thallium. This crystal has the desirable property of converting gamma ray energy into light scintillations and is transparent to the passage of the light produced therein.

The scintillations of the crystal 19 are arranged to control a photo-electric multiplier tube 20 or other suitable means for converting the scintillations into electrical pulses. The photo-electric tube is connected through suitable circuit devices which include matching devices 21 and 22 or in the alternative through a cathode follower with surface detecting devices and equipment in the surface station 12 and including storage means as generally indicated by the numeral 23.

It will be appreciated that various radiation sources may be utilized, and in Fig. 1, the radiation source is indicated by numeral 24, and shown as being centrally positioned at the lowermost end of the exploration unit and physically spaced and separated from the crystal 19 by a series of blocks or layers of absorbing materials, as generally indicated by the numeral 25, in a manner and for a purpose well understood in the art.

Source of primary radiations

As a source of nuclear primary radiations, preparations such as radium-beryllium, polonium-beryllium or antimony-beryllium may be utilized as an available source of neutron flux. The nuclear radiation may also be produced by a low voltage accelerator system by means of which it is possible to obtain a considerable improvement in the available neutron flux over the first mentioned types of sources. In addition, it is contemplated that a disintegration process might be utilized as a suitable source by accelerating deuterons to voltages of the order of a few hundred thousand, the accelerated deuterons being utilized to bombard tritium.

The low voltage acceleration system might take the form of a linear accelerator and this would be particularly suitable for use in bore holes. The process of gamma irradiation would not in general complicate the procedure. The procedure contemplated in the present invention is one in which the earth materials are irradiated for a time appropriate to the particular element which it is desired to study. Whenever possible or practical this time represents a significant fraction of the half-life for the particular activity induced in the element in question. Where this half-life is of the order of several hours it might not in all cases be possible or desirable to achieve this. Thus, the desirability of utilizing the strongest possible sources of neutrons will be appreciated in order to obtain the largest activities possible in a given interval of time.

Detection techniques

Consideration will now be given to the means by which this activity may be analyzed in accordance with the present invention. It is proposed that the method of analysis be based on a study of the energies of the gamma radiations from the decay products and of the half-lives of these decay products, and that the study be undertaken by means of a scintillation spectrometer. The details of the procedure of analyzing the gamma spectrum, as followed in the carrying out of the method of the present invention, of necessity involve a technique which embodies the study of the pulse height distribution from the crystal or scintillation counter. For this purpose the following techniques are utilized:

(a) Integral bias discriminator
(b) Differential bias discriminator
(c) Continuous scanning differential bias discriminator
(d) Multiple differential discriminator (kicksorter)
(e) Photographic storage utilizing a cathode ray oscillograph displaying the output pulses
(f) Photographic storage utilizing the grey wedge technique
(g) Photographic storage utilizing cathode ray beam intensity modulation giving the electronic equivalent of (f)
(h) Electrostatic storage It is further proposed that the following methods may also be utilized in the method of the present invention:

(a) Magnetostatic storage
(b) Detailed analysis by means of tape or acoustic recorder The half-lives are deduced from measurements either continuously or periodically. To permit rapid determination of the half-life of an isotope, a recorder with a logarithmic response is used to record the decay rate continuously.

Figure 2:
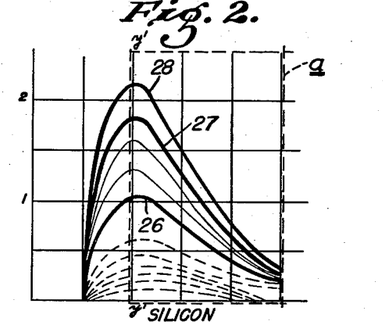
Fig. 2 is a view illustrating the technique of photographic storage of a characteristic record obtained by one method.

As shown generally in Fig. 2, the photographic storage technique is illustrated for the element silicon. Oscillographs of the voltage pulse height distributions were obtained by photographing the voltage pulses on a screen subsequently to the bombardment of the element with a strong neutron flux. The silicon activity is complex in as much as it shows two characteristic half-lives of 2.3 minutes and 6.7 minutes respectively. In the spectral distribution curve of Fig. 2, three prominent lines 26, 27 and 28 were observed in the gamma ray spectrum, as illustrated. Various of the lines thus produced are of different intensity and their intensity is a measure of the intensity, i.e., number of pulses per second. The differences in intensity may be more accurately resolved as explained later in connection with Figure 3. In Figure 2 the abscissae represent time, the ordinates represent energy and the intensity of the various traces represents intensity, i.e., number of pulses per second. Each trace is due to different time spaced pulses that serve to initiate a sweep of the oscilloscope shown in Figure 5. The duration of each sweep corresponds generally to the scintillation time of the crystal detector as modified by the result produced by the pulse lengthener, i.e., each pulse has substantially the same length. In this example, the observed activities are attributed in the main to fast neutrons. Thus, the half-life provides a characteristic marker for the detection and estimation of the percentage of silicon in the formation being studied, and the same method may be utilized in the detection of certain other elements. Each element will have its own characteristic gamma ray spectrum and half-life, and in the simpler cases a detailed analysis is possible.

Figure 3:
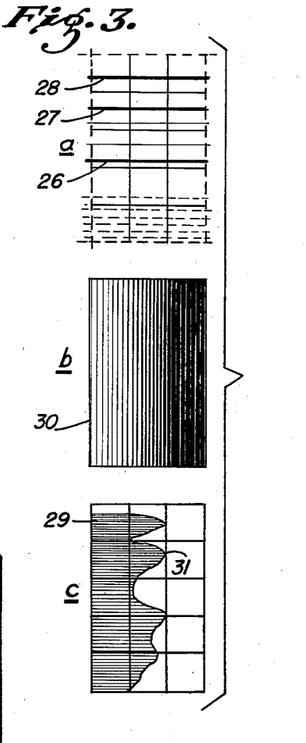
Fig. 3 is a view illustrating the grey wedge technique of recording the data.

Fig. 3 is a composite view illustrating the grey wedge technique for facilitating an analysis of the gamma spectrum shown in Figure 2. The area shown in Fig. 3a corresponds with the area a designated by dotted lines in Fig. 2, and shows the continuation of the peak values of the three prominent lines as straight lines across the area which are photographed with the same intensity in which they appear in Figure 2. This is accomplished by means well understood in the art. These three prominent straight lines are then photographed on to a negative 29 as represented in Fig. 3c, through a grey wedge member 30, as shown in Fig. 3b. This gives a photograph as indicated in Fig. 3c wherein the pulse peak limits are indicated at the edge 31 of the dark area of the photograph. The vertical coordinates of the negative 29 as seen in Figure 3 correspond to pulse height or energy and the horizontal coordinates correspond to intensity or number of pulses per second; and thus have the same coordinates as in Figure 4.

Figure 4:
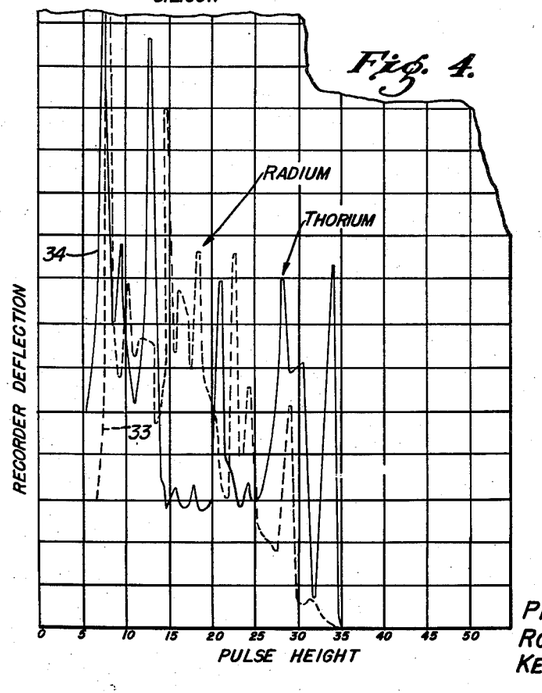
Fig. 4 is a view illustrating still another technique in the form of a differential pulse height discriminator recording.

Referring now to Fig. 4, there is shown a characteristic recording taken from a differential pulse height discriminator such as indicated generally by numeral 32 in Fig. 9. These traces were obtained automatically by the continuous scanning method, wherein the base is referred to as pulse height and the vertical refers to recorded deflection. The recorded deflection is proportional to the number of pulses of any given pulse height received in a certain period of time. From this recording, it will be seen from trace 33 that the spectrum produced by radium is very different from the spectrum of thorium, trace 34. While thorium and radium isotopes are natural unstable isotopes, graphs of artificially induced isotopes such as iridium are also recognizable by graphs having specific identifying characteristics. These particular graphs are diagrammatic.

Figure 5:
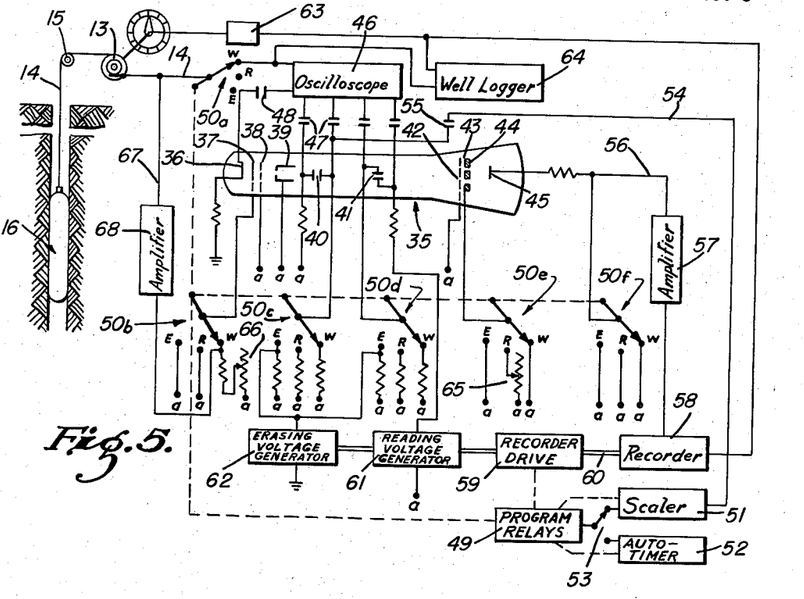
Fig. 5 is a schematic circuit diagram for the electrostatic storage technique of recording the data.

The electrostatic storage technique will now be described, and the circuitry and means by which said technique may be accomplished and practiced. Referring to Fig. 5, this method of analyzing embodies the utilization of a memory or storage tube, as generally indicated by the numeral 35. A tube of this type is described in the Proceedings of the I.R.E., vol. 38, No. 7, July 1950 by R. C. Hergenrother and B. C. Gardner, and has been commercially embodied in a tube of Raytheon Manufacturing Company bearing designation QK411.

Basically the memory tube comprises a cathode 36, a modulating grid 37, a focusing grid 38, an electron gun anode 39, horizontal deflection plates 40 and vertical deflection plates 41. As thus far described, the tube structure is essentially that of a cathode-ray tube whose electron spot is focused and scanned over the area of a first screen 42 which is operatively associated with a storage screen conducting mesh 43 on one side of which is a coating of storage material 44. To the right of the storage screen is a metal target 45 which serves as an electron mirror during "writing" and as an electron collector for the output signal during "reading."

By modulating the electronic beam and causing it to scan the storage screen, it is possible to store electrostatically information as an image or picture on the storage screen, this operation being termed "writing." The same electron beam by proper adjustment of voltages in a manner well understood in the art is then utilized for "reading" the image or picture after a time interval and transcribing said image or picture into a visible image or picture, or a record as in the present instance. After the image or picture has been transcribed, it is "erased" from the storage screen to permit the placing of a new image or picture thereon.

The storage tube elements and associated components are connected with suitable potential sources for accomplishing operations under desired conditions. For simplicity, potential connection terminals have therefore been indicated at a. The horizontal deflection plates 40 and vertical deflection plates 41 of the storage tube are connected in parallel with the deflection plates of an oscilloscope 46, suitable capacitors 47 being inserted in each connection. The cathode 36 is connected through a pulse intensifying circuit with the oscilloscope tube, this circuit containing a capacitor 48 therein. With this arrangement, the electron beam of the storage tube 35 is controlled similarly to the electron beam of the cathode ray tube of the oscilloscope, and thus form a picture or image on the storage screen corresponding with the image or picture which is produced on the oscilloscope. This image or picture may be of the character for example, as shown in Fig. 2 which is for the element silicon.

Circuit switching for certain of the operations and to change the potentials for the "writing," "reading" and "erasing" operations of the storage tube 35 are accomplished by suitable relays which have been designated generally as program relays and identified by numeral 49, as will be seen the relays are arranged to actuate gang connected switches 50a, 50b, 50c, 50d, 50e and 50f, each of which has selectively closable contacts "W," "R" and "E" for the "writing," reading" and "erasing" operations, respectively. These switches are normally in the "writing" position with contacts "W" closed.

During a normal "writing" operation, electrical pulses are delivered from the exploration until 16 through the cable conductor 14 to the oscilloscope 46 which visibly indicates a spectrum such as shown in Fig. 2, such spectrum being also at this time recorded on the storage screen 43. These pulses are recorded in relation to their voltage or pulse height, and the voltage or potential stored on the screen would be in proportion to the number of pulses stored on any part of the screen. In other words, where a great number of pulses are stored on the screen the lines would be of greater intensity, and where few pulses are stored a lower voltage would be recording and lighter lines would appear.

When the recorded image or picture is now scanned, the intensity of a stored image or picture on the storage screen is obtained by connecting the storage tube for a "reading" operation. This change-over is made after receipt of a predetermined number of pulses as determined by the setting of a scaler 51, or after a predetermined time interval as determined by an auto-timer 52, a switch 53 being provided for selectively connecting the scaler or auto-timer. The scaler, as shown in Fig. 5, is energized from the circuit of deflection plates 40 through a conductor 54 containing capacitor 55.

By transcribing, the scanned area is reproduced or a desired record made. In the present instance, for example, the spectrum of Fig. 2 is vertically scanned along the line or axis y'—y' and the current pulses transmitted over a conductor 56 through an amplifier 57 to a recorder 58 where the variations of intensities are recorded. The recorder is of any conventional type, for example, a strip recorder in which a pen draws the record on a moving strip. Since these intensities are indicative of the element identifying traces on the spectrum and indicate a quantitative measurement, this record serves to give a measure of the amounts of elements detected.

The recorder 58 does not operate until the scaler 51 or auto-timer 52 causes appropriate programing relays to energize a recorder drive 59, and actuate the switches 50a to 50f for connecting the storage tube for a "reading" operation. The energized recorder drive actuates the recorder through a mechanical connection, such as shaft 60, and at the same time operates a suitable reading voltage generator 61 from which a sweep voltage is applied to the storage tube 35 is synchronism with the operation of the recorder.

At the conclusion of the scanning operation, suitable limit switches associated with the recorder cause it to cease operation, and the program relays change the switches 50a to 50f so as to connect the storage tube with an erasing voltage generator 62 for an "erasing" operation in which the image or information on the storage screen is erased and the storage screen prepared to receive the next set of pulses. The erasing voltage generator is shown also as being actuated by the shaft 60, so that the "erasing" operation is synchronized with the recorder operation.

While it is possible to visually determine from the pointer 17 the location of the exploration unit in a well bore or other hole in an earth formation, this may not prove entirely satisfactory when the observations are being taken continuously and at a rather rapid rate. For the latter conditions, there is associated with the pointer 17 a counter 63 which is arranged to count the footage run of the cable conductor over the measuring sheave. This counter is connected with a well logger 64 for indicating the overall pulse rate, and with the recorder 58 so as to automatically indicate at these devices the footage level at which the record is being taken.

Figure 6:
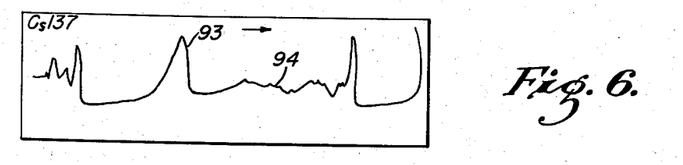
Figs. 6, 7 and 8 are views illustrating characteristic strip records obtainable by the electrostatic storage procedure.
Figure 7:
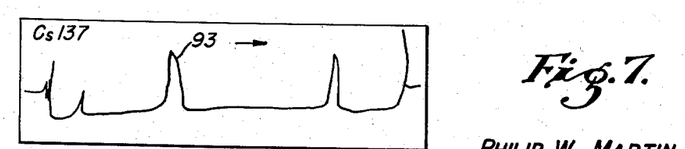
Figure 8:
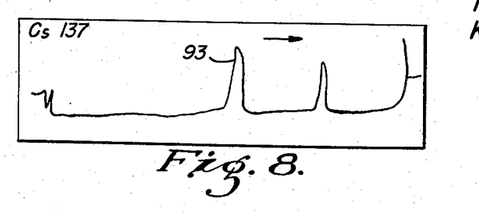

Figs. 6, 7 and 8 indicate exemplary characteristic curves as obtained on a recorder of the moving strip type for $Cs^{137}$ wherein the intensities of the spectrum pulse heights and energy distribution are indicated. Corresponding pulses are indicated by the numeral 93 in the respective figrures. In Fig. 6, the jagged portion 94 of the curve is caused by the Compton effect. This portion of the curve may be smoothed out, as shown in Fig. 7, by raising the threshold. This may be accomplished by increasing the bias potential on the storage screen during the "reading" operation of the storage tube, as by means of a suitable potentiometer 65.

Under some operating conditions of the electrostatic storage mechanism, it is desired to accentuate the lighter traces of the spectrum, and this is done by increasing the number of pulses counted or the length of time during which pulses are counted before switching the storage tube to a "reading" operation. This is also accomplished by increasing the electron flow by adjusting potentiometer 66.

Further flexibility of the electrostatic storage apparatus is obtained by modulating the electron beam by changing the y-axis gain of the storage tube. One manner in which this may be accomplished is shown in Fig. 5, wherein a conductor 67 connects from conductor 14 through an amplifier 68 with contact "W" of switch 59b. As thus arranged, the pulses from the exploration unit 16 are utilized to vary the gain in amplifier 68 and thus modulate the electron beam and vary its intensity. Moreover, by changing the intensity or y-axis gain of the electron beam it is possible by such means to compress a desired portion of the record, as indicated in Fig. 8, where the portion 93 has been compressed or shifted to the right.

We have in the above description described the apparatus generally and the different techniques which are utilized in identifying the elements present in the material. Several methods of operation are contemplated in the practice of the invention, and these methods are now described.

Continuous method

For carrying out this type of procedure, the apparatus such as disclosed in Fig. 1 is utilized. As previously explained, the neutron source 24 is separated a finite distance from the crystal 19 of the scintillation spectrometer, and absorbing materials 25 inserted in order that no direct effects are recorded by the spectrometer due to primary or scattered nuclear radiations. In the continuous method of operation, the scintillation spectrometer is moved into position of analysis subsequent to the radiation process simply by movement of the exploration unit through a distance along the bore hole equal to the spacing distance between the source and the crystal of the scintillation spectrometer, this movement of course being in appropriate direction. The half-life decay period of the unstable isotopes produced by the irradiations is then measured and studied in accordance with any of the techniques which have been previously mentioned or described.

Discontinuous method

The procedure in this case is carried out as follows: An analysis is first made at the desired level in the well bore of the distribution of gamma ray energy produced by the natural radio active elements in the earth, such as radium, uranium, thorium, actinium, potassium, and the like. After an analysis of the particular zone has thus been made, the zone is bombarded by a neutron flux for a desired length of time. Immediately after bombardment, the scintillation spectrometer is moved into position to record the effects of the induced activity, at which time the decay characteristic of the induced activity is studied simultaneously with the energy distribution of the induced activity by any or all of the techniques previously described. Thus, the material in the wall of the bore hole may be determined by nuclear analysis. For example, in searching for vanadium ore deposits, one would be interested in observing a 3.7 minute half-life and gamma ray spectrum of the known activity of vanadium and similarly for other elements such as silver, manganese, nickel, etc. By knowing the characteristic energy distribution and decay times, the different elements can be detected.

Selective interval between irradiation and detection method

This method is utilized where it is desired to separate competing activities of widely differing half-lives. By selecting the time interval which elapses between the bombardment of the material and the spectrum analysis, the effect of the particular element which it is desired to study may be made more prominent.

Selective irradiation time method

Competing activities of elements having rather widely differing half-lives may also be separated by selecting the time during which the material is subjected to irradiation or bombardment. For example, $Al^{28}$ having a half-life of 2.6 minutes requires an irradiation time of the order of 2.6 minutes, whereas $I^{128}$ having a half-life of 25 minutes requires an irradiation time of the order of 25 minutes. Thus by selecting the irradiation time from a knowledge of the half-lives of the elements, it is possible to select preferentially the element in the formation in which one is most interested.

Selective discrimination by varying bombarding neutron speed method

In certain instances, conflicting activities are separated by the selective use of neutrons having high or low velocity. For example, $Al^{27}$, when bombarded by thermal or slow neutrons produces 2.3 mev. $Al^{28}$, which on decay produces a gamma ray of 1.8 mev. energy. This same unstable isotope, $Al^{28}$, may be produced from $Si^{28}$, which is the most common form of silicon, when bombarded by a neutron source of 1 mev. energy. It will therefore be apparent that if a formation contains both aluminum and silicon, it might be found difficult upon bombardment by fast neutrons to distinguish between the aluminum and silicon. However, if a slow neutron source is selected, for example, antimony-beryllium which produces neutrons having an energy of approximately thirty thousand electron volts, then one is certain that only aluminum produced the unstable isotope $Al^{28}$. Thus, one produces an all aluminum log for a well bore formation.

Modified apparatus

Referring now to Fig. 9, a modified arrangement of the apparatus is disclosed. Such modification may be utilized independently or may be combined with an exploration unit such as disclosed in Fig. 1.

In the modified construction, a radiation source is mounted as indicated by the numeral 24', close to one side of the casing of the exploration or logging tool and this source is maintained in close proximity to the well wall and the adjacent formation by means of belly springs 69—69 carried by the casing.

In this modified construction, a similar cell structure 18' is mounted at the upper end of the exploration unit.

In this arrangement, different types of radiation sources are utilized so that it is possible to carry out simultaneously different types of logging. Placing of the source at one side of the casing, as described above, prevents the slowing down of the neutrons or other radiations by hydrogenous materials in the well.

While the invention has primarily been described as utilizing a source of neutron radiations for the primary emission, it is contemplated that the apparatus may also utilize a flux of high energy gamma radiation, in which case the decay products are subsequently studied. As a source for such radiation, the neutron source is replaced by an activated unstable isotope, such as antimony or by a high energy accelerator. The latter type of source is of particular interest for oil well logging as $C^{12}$ produces certain very characteristic effects when the bombarding radiation has an energy of the order of 20 m.e.v.

It is believed to be obvious to those skilled in the art that the resolution of the scintillation spectrometer is a pertinent factor and highly important in the operation of the herein described invention. The resolution which is obtainable from the arrangement disclosed in Fig. 1 is improved by utilizing two photo-multiplier tubes in conjunction with a single crystal so that the light from the crystal passes into both tubes. These two photo cells are adjusted to give voltage pulses of similar height for a given gamma ray energy, in which case the voltage outputs are simply added together. In this way much more light is effectively collected from the crystal, and at the same time the light from the different parts of the scintillating crystal is collected in a much more uniform manner. As an alternative, the outputs of the two photo-multiplier tubes are passed to two differential discriminator circuits and then to a coincidence circuit. This arrangement has been found to give a somewhat sharper line for a given gamma ray energy, when the differential discriminators are used to scan the spectrum continuously and in step with one another.

Improved resolution is also obtained by utilizing a light reflector mounted behind the photo sensitive surface of the photo-multiplier tube in such a way that photons, which had passed through the sensitive surface without producing photo-electrons, are, in the main, reflected back to the surface and thus have a further opportunity to produce photo-electrons.

While specific electronic devices have been indicated in connection with the scintillation spectrometer, it is within the scope of the present invention contemplated that other suitable devices and circuits may be utilized. For example, a photo-multiplier tube 20 has been disclosed, but such tube may be replaced by other types of devices for the same purpose, such as the electronic light amplifier as disclosed in the Lee de Forest, et al., United States Letters Patent, No. 2,594,740.

As illustrative of the application of the above procedures to commercial oil will logging, the following is cited:

The aluminum content of limestone formation is considerably less than that found in typical sand and shale formation. A neutron activation of the well formation thus lead to the production of large aluminum activities in the sand and shale formation, but only a very small aluminum activity in the limestone. The aluminum 1.8 m.e.v. gamma ray effect is such a promiennt one that simple integral biasing of the neutron induced activity leads to continuous aluminum logging in which low activities are excellent markers for the limestone formation. This is believed to be the only effective method, electric or radioactive, developed up to the present time for the logging of limestone formation.

Another illustration of considerable importance is the ability to distinguish between salt and fresh water in the well formation. We have found it possible to activate the sodium constituent of the salt water to form 14.9 hour sodium 24 with gamma rays of 1.4 and 2.8 m.e.v. The resultant induced activities are weak owing to the long half-life, but a process of continuous logging is quite possible due to the distinctiveness of the high energy 2.8 m.e.v. line.

In addition to the analysis of decay gamma rays, the invention is adaptable also to the analysis of neutron capture gamma rays. This feature of the invention is accomplished by decreasing or shortening the space between the source 24 and the detector 19 in the logging instrument. Each element is characterized by its own capture gamma ray spectrum and the above methods of analysis apply equally to these radiations.

It is evident that the present invention is readily adapted for the analysis of other nuclear and atomic reactions, for example:

(1) Natural gamma radiation;
(2) Photodisintegration neutrons;
(3) Neutrons inelastically scattered by the formation;
(4) Gamma rays scattered by the formation;
(5) Gamma ray induced x-rays and various others.

The apparatus and method as described herein have been successfully utilized with gratifying results in wells, where a good indication of a structural formation has been obtained. It is therefore contemplated that various modifications may suggest themselves to those skilled in the art without departing from the spirit of the present invention, and, hence, we do not wish to be restricted to the specific form or forms shown or uses mentioned, except to the extent indicated in the appended claims.

We claim:

1. Apparatus for identifying a substance by its property of emitting secondary radiations, comprising: an exploration unit having an elongate casing; a source of primary radiations positioned in close proximity to a wall of said casing; means for holding said wall at the position of said source against a formation containing a substance to be investigated, said means producing pulses proportional to the energies of the radiations causing them; means for transmitting said pulses to the surface; means for storing said pulses at the surface while preserving proportionality; and means enabling a subsequent analysis of the pulse height distribution to be made.

2. Apparatus for identifying a substance by its property of emitting secondary radiations, comprising: an exploration unit having an elongate casing; a source of primary radiations positioned in close proximity to a wall of said casing; springs for holding said wall at the position of said source against a formation containing a substance to be investigated, said means producing pulses proportional to the energies of the radiations causing them; means for transmitting said pulses to the surface; means for storing said pulses at the surface while preserving proportionality; and means enabling a subsequent analysis of the pulse height distribution to be made.

3. Apparatus for identifying a substance by its property of emitting secondary radiations, comprising: a source of primary radiations adapted to be relatively placed within effective range of a substance to be identified to produce unstable isotopes therein; and detecting means for identifying the characteristic decay and radiation energy distribution of said isotopes including means for storing such indications.

4. Apparatus for identifying a substance by its property of emitting secondary radiations, comprising: a source of primary radiations adapted to be relatively placed within effective range of a substance to be identified to produce an unstable isotope therein; and detecting means for indicating the characteristic decay and radiation energy distribution of said isotope including means for photographically storing the energy distribution characteristic.

5. Apparatus for identifying a substance by its property of emitting secondary radiations, comprising in combination: a source of primary radiations adapted to be relatively placed within effective range of a substance to be identified to produce an unstable isotope therein; and detecting means for indicating the characteristic decay and radiation energy distribution of said isotope including means for photographing said indications through an optical wedge.

6. Apparatus for identifying a substance by its property of emitting secondary radiations, comprising: a source of primary radiations adapted to be relatively placed within effective range of a substance to be identified to produce an unstable isotope therein; detecting means for indicating the characteristic decay rate of said isotope; and means for recording said indications, said means having an approximate logarithmic response whereby the rate of decay of the isotope may be readily ascertained.

7. The method of investigating a material to determine the identity of elements therein, which comprises the steps of: bombarding the material with a primary radiation to form unstable isotopes therein; detecting the radiations by an energy proportional device, recording the signals in analog form, subsequently analyzing the distribution of the signals and selectively separating said isotopes by utilizing different speeds of primary radiations.

8. The method of investigating a material to determine the identity of elements therein, which comprises the steps of: bombarding the material with a primary radiation to form unstable isotopes therein; detecting the radiations by an energy proportional device, recording the signals in the analog form, subsequently analysing the distribution of the signals and selectively separating said isotope by utilizing primary radiations of different energies.

9. The method of investigating a material to determine the identity of elements therein, which comprises the steps of: converting radiations from the material being investigated into electrical pulses; impressing a predetermined count of said pulses upon a storage medium to form a stored image thereon characteristic of said elements; and thereafter transcribing a characteristic of said stored image on to a record strip.

10. The method of investigating a material to determine the identity of elements therein, which comprises the steps of: converting radiations from the material being investigated into electrical pulses; impressing pulses upon a storage medium for a predetermined time to form a stored image thereon characteristic of said elements; and thereafter transcribing a characteristic of said stored image on to a record strip.

11. The method of logging a hole to determine the identity of elements at points along the hole, which comprises successively carrying out of the following steps at each point in the hole: converting radiations from the formation adjacent the point under consideration into electrical pulses; impressing said pulses upon a storage medium to form a stored image thereon characteristic of an element in said formation; transcribing a characteristic of said stored image into a record; and thereafter erasing said image prior to consideration of the next point.

12. In apparatus of the character described: means adapted to emit electrical pulses in response to bombardment by radiations from a material containing an element to be identified; means activated by said pulses for storing information characteristic of said element; means for predetermining the number of pulses delivered to said storing means; and means for converting said information into a record from which said element may be identified.

13. In apparatus of the character described: the combination comprising, means adapted to emit electrical pulses in response to bombardment by radiations from a material containing an element to be identified; electrostatic storage means having a medium adapted in response to said pulses to store information characteristics of said elements; and means for converting said information into a record from which said element may be identified.

14. The method of investigating a material to determine the identity of elements therein, which comprises the steps of: converting radiations from the material being investigated into electrical pulses; utilizing said pulses to form an image characteristic of said elements and accentuate certain of said image characteristics; and thereafter recording said image.

15. In apparatus of the character described: the combination comprising, means adapted to emit electrical pulses in response to bombardment by radiations from a material containing an element to be identified; an electronic information storage tube including a modulating grid, electron beam deflecting means and a storage screen adapted to be traversed by said beam; switching means for selectively connecting said grid, deflecting means and screen with "writing" and "reading" circuits by which information characteristic of said element is stored on said screen and transcribed from said screen; and recording means coupled with said "reading" circuit adapted to translate the transcribed information.

16. In apparatus of the character described: the combination comprising, means adapted to emit electrical pulses in response to bombardment by radiations from a material containing an element to be identified: an electronic information storage tube including a modulating grid, electron beam deflecting means and a storage screen adapted to be transversed by said beam; switching means for selectively connecting said grid, deflecting means and screen with "writing" and "reading" circuits by which information characteristic of said element is stored on said screen and transcribed from said screen; means for modulating the electron beam in response to said electric pulses so as to vary the electron beam intensity during certain portions of its deflection movement; and recording means coupled with said "reading" circuit adapted to translate the transcribed information.

17. In apparatus of the character described: the combination comprising, means adapted to emit electrical pulses in response to bombardment by radiations from a material containing an element to be identified; an electronic information storage tube including a modulating grid, electron beam deflecting means and a storage screen adapted to be traversed by said beam; switching means for selectively connecting said grid, deflecting means and screen with "writing" and "reading" circuits by which information characteristic of said element is stored on said screen and transcribed from said screen; recording means coupled with said "reading" circuit adapted to translate the transcribed information; and means for applying an increased bias to said storage screen during connection to said "reading" circuit, whereby Compton effects in said transcribed information are eliminated.

18. In apparatus of the character described: the combination comprising, means adapted to emit electrical pulses in response to bombardment by radiations from a material containing an element to be identified; an electronic information storage tube including a modulating grid, electron beam deflecting means and a storage screen adapted to be traversed by said beam; switching means for selectively connecting said grid; deflecting means and screen with "writing" and "reading" circuits by which information characteristic of said element is stored on said screen and transcribed from said screen; recording means coupled with said "reading" circuit adapted to translate the transcribed information; and means synchronized with said recording means for controlling the deflection of said beam in one direction during connection to said "reading" circuit.

19. In apparatus of the character described: the combination comprising, means adapted to emit electrical pulses in response to bombardment by radiations from a material containing an element to be identified; an electronic information storage tube including a modulating grid, electron beam deflection means and a storage screen adapted to be traversed by said beam; switching means for selectively connecting said grid, deflecting means and screen with "writing" and "reading" circuits by which information characteristic of said element is stored on said screen and transcribed from said screen; recording means coupled with said "reading" circuit adapted to translate the transcribed information; and means synchronized with said recording means for applying an information erasing potential to said storage screen.

20. Apparatus for identifying a substance by its property of emitting secondary radiations, comprising: a source of primary radiations adapted to be relatively placed within effective range of a substance to be identified to produce an unstable isotope therein; means for detecting the radiations from the unstable isotope, said means producing pulses proportional to the energies of the radiation; means for transmitting said pulses to the surface; means for storing said pulses at the surface while preserving proportionality; and means to enable analysis of the pulse height distribution to be made.

21. Apparatus as set forth in claim 20 including means for storing said pulses at the surface in analog form as to amplitude but in which pulses of a large amplitude are intensified so as to exaggerate their apparent frequency of occurrence; and means enabling stored information to be displayed on a recorder chart.

22. Apparatus as set forth in claim 20 including means for analysing said pulses and converting the same to a coded form; and magnetic tape means for recording the coded information.

23. Apparatus for identifying a substance by its property of emitting gamma radiations comprising: a source of neutrons adapted to be relatively placed within effective range of a substance to be identified to produce neutron capture gamma rays; and detecting means for identifying the radiation energy distribution of said gamma rays including means for storing said indications.

24. Apparatus for identifying a substance by its property of inelastically scattering neutrons, comprising: a source of neutrons adapted to be relatively placed within effective range of a substance to be identified by its property to produce gamma rays as a result of the inelastic scattering of neutrons therein; and detecting means for identifying the radiation energy distribution of said gamma rays including means for storing such indications.

References Cited in the file of this patent

UNITED STATES PATENTS

| | | |
|---|---|---|
| 2,303,688 | Fearon | Dec. 1, 1942 |
| 2,443,680 | Herzog | June 22, 1948 |
| 2,508,772 | Pontecorvo | May 23, 1950 |
| 2,525,077 | Morton | Oct. 10, 1950 |
| 2,548,789 | Hergenrother | Apr. 10, 1951 |
| 2,586,392 | Sheldon | Feb. 19, 1952 |
| 2,636,994 | Neufeld | Apr. 28, 1953 |
| 2,648,012 | Scherbatskoy | Aug. 4, 1953 |
| 2,659,011 | Youmans et al. | Nov. 10, 1953 |
| 2,711,482 | Goodman | June 21, 1955 |
| 2,769,096 | Frey | Oct. 30, 1956 |
| 2,778,947 | Scherbatskoy | Jan. 22, 1957 |

Notice of Adverse Decision in Interference

In Interference No. 93,279 involving Patent No. 2,965,757, P. W. Martin, R. W. Pringle and K. I. Roulston, SPECTRAL ANALYSIS OF MATERIALS, final judgment adverse to the patentees was rendered Apr. 1, 1965, as to claims 3, 23, and 24.

[*Official Gazette May 18, 1965.*]